March 21, 1950
T. M. RECTOR
2,501,634
HELIX OF METAL WIRE FOR USE AS FISHING
SINKERS AND FOR OTHER PURPOSES
Filed July 23, 1948
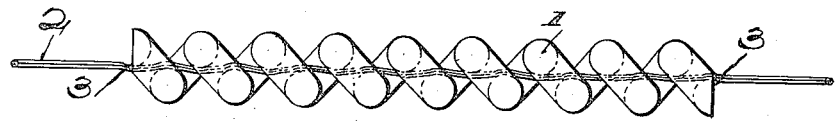
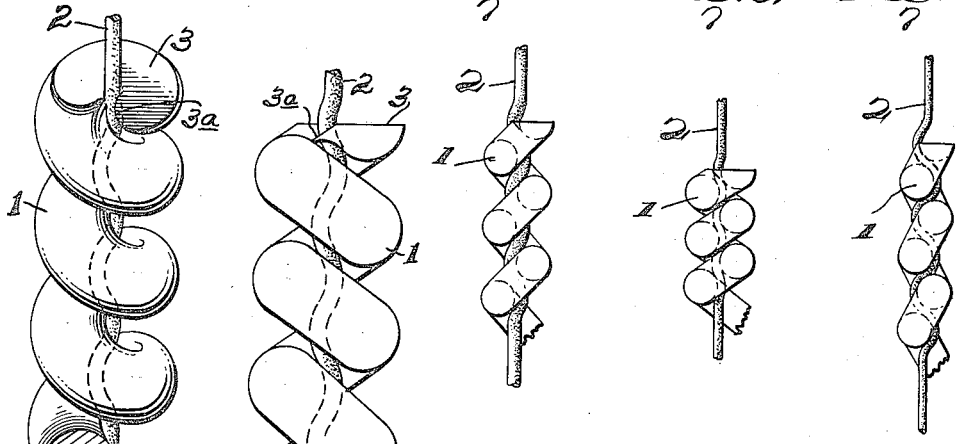
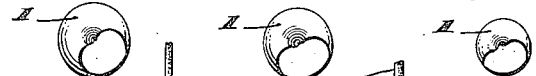
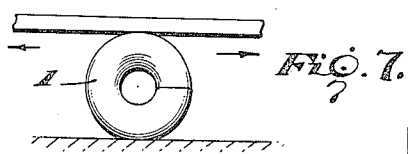
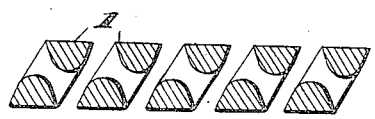
Inventor
Thomas M. Rector
By Cameron, Kerkam & Sutton
Attorneys Patented Mar. 21, 1950

2,501,634

UNITED STATES PATENT OFFICE 2,501,634

HELIX OF METAL WIRE FOR USE AS FISHING SINKERS AND FOR OTHER PURPOSES

Thomas M. Rector, Morristown, N. J.

Application July 23, 1948, Serial No. 40,286

2 Claims. (Cl. 43—44.89)

This invention relates particularly to fishing sinkers capable of being quickly and easily attached to and detached from a fishing line at any desired point, the sinker being firmly secured on the line against slipping or accidental detachment.

Sinkers must be secured firmly at the desired point on a fishing line, leader or which may be of any suitable type and material such as twisted or braided linen, silk or cotton, twisted, braided or monofilamentary nylon or like plastic, metal wire and so on. For convenience any such line or leader will be referred to hereinafter simply as a line. Usually the ends of the line are not free to thread through the sinker and hence the latter must be capable of attachment to the line at any desired point in the length thereof. Moreover, the sinker must be attached in such a manner that it will neither slip nor come off the line. Hence as a rule some sort of knot must be used to secure the sinker in place, although knots weaken the line, cause tangles, and pull tight when wet so that they can be untied only with difficulty. Strip lead is sometimes wound around the line to provide a light sinker, but even though skillfully applied a knot or the like is still necessary to prevent slipping of such a sinker up and down the line. Moreover, the strip lead is fragile and difficult to remove without damaging it to such an extent that it cannot be used again, while on the other hand such sinkers frequently become unfastened when subjected to frequent casting or like forces.

The present invention provides a simple inexpensive device that can be manufactured in large quantities at low cost and is capable of being attached readily to and detached readily from the line at any desired point in the length thereof without knots or other damage to the line and without damaging the device itself. In addition to these advantages, devices embodying the invention will remain firmly secured to the line without slipping and without becoming unfastened even though subjected to severe usage.

Several embodiments of the invention are illustrated in the accompanying drawings, but it is to be expressly understood that said drawings are for purposes of illustration only and are not to be construed as a definition of the limits of the invention, reference being had to the appended claims for this purpose.

In the drawings,

Fig. 1 is a view showing one embodiment of the invention secured in place on a line;

Figs. 2–4, inclusive, are diagrams illustrating variations in the proportions of the device shown in Fig. 1, the corresponding Figs. 2a–4a showing said proportions in planes at right angles to the axis of the device;

Fig. 5 illustrates diagrammatically a step in the manufacture of another embodiment of the invention;

Fig. 6 is a sectional view of a device produced according to Fig. 5; and

Figs. 7 and 8 illustrate further embodiments of the invention, and

Figs. 9 and 10 are enlarged views illustrating the use of the device.

Sinkers embodying the invention are attached to a line, or vice versa, by simply winding the line loosely in the spaces between the turns or convolutions of a spiral or helical device the proportions of which are subject to limitations set forth below, and then pulling the line tight in an axial direction. The secure affixation of the device to the line results from the fact that the line is thus drawn into a tight spiral of smaller diameter than the device but of the same pitch or lead, the convolutions of the line closely following and intimately contacting the convolutions of the device with a sort of spiral crimping effect and a firm frictional grip on the entire length of line that is wound in the device. Thus the device becomes in effect integral with the line itself. The spiral device itself is made of flexible non-resilient metal wire and its free ends can be deformed into clamping engagement with the line at the ends of the device to prevent unwinding. Once this condition is established as explained more fully hereinafter, the device will not slip and can not even be pulled longitudinally on the line, and the line does not loosen even when subjected to snapping or whipping effects as in fly casting and the like. In fact, the line can be loosened only by loosening the ends of the wire and then unwinding the line from the device.

The condition described above is illustrated generally in Fig. 1 which shows a sinker comprising a coil or helix 1 of flexible non-resilient metal wire and a line 2 wound in the spaces between the turns of the wire helix and then pulled tight at the ends. The opposite ends of the wire helix, which may be cut off in planes at right angles to the axis of the helix as shown at 3 in Fig. 1 and on a larger scale in Figs. 9 and 10, curve around and hold the line as it emerges from each end of the helix. The relatively thin tips 3a (Figs. 9 and 10) which are formed where the ends of the cut surfaces 3 intersect the surfaces of the wire are preferably bent in around the line into engagement with the next coil of the helix as shown in Fig. 10 to aid in preventing accidental unwinding. The result is that the sinker is secured firmly in place on the line and will not slip or become unfastened even though subjected to severe usage. However, it may be removed simply by freeing the line from one of the ends 3 and unwinding it from the sinker, leaving both line and sinker undamaged and in condition for further use.

For sinker purposes the wire 1 may suitably be made of any relatively heavy soft flexible metal such as lead, soft copper, and soft brass. The wire may have any desired cross sectional shape such as round, square, oval, etc., and its surface may also be roughened in any suitable manner to enhance the gripping effect on the line, but very good results are obtained with ordinary smooth, round wire. The length of the helix, i. e., the number of turns, can be varied as desired. As a rule there should be at least four or five turns to insure a firm grip on the line. More turns can be used to provide a still firmer grip and increased weight, but it is not desirable to extend the helix much beyond 12–15 turns for reasons of convenience in attaching and detaching the sinker.

At a helix length of about 8–10 turns, the size (i. e., diameter) of the wire can be selected to provide the desired weight for the intended purpose. For example, in the case of fishing sinkers used with light tackle for fly casting, 8–10 turns of lead wire of about one-sixteenth inch diameter affords adequate weight and with heavier tackle, proportionately larger wire can be used. Although such wire may be much larger than the line to which it is attached, nevertheless a firm grip is secured when the following limitations are observed.

I have found that effective gripping action of the device depends on maintaining definite relationships between the pitch or lead of the helix, the outside diameter of the helix, and the size of the wire used in the helix. For convenience these relationships can be stated in terms of ratios of pitch and of outside diameter to wire diameter as follows:

(1) The ratio of pitch of the helix to the diameter of the wire, hereinafter called the "pitch ratio," may vary from 1.25/1 to about 2/1.

(2) The ratio of outside diameter of the helix to the diameter of the wire, hereinafter called the "diameter ratio," may vary from 1.5/1 to 2/1.

These relationships are of general application to wire that may vary in size as explained above, and a device embodying them can be applied to lines of various sizes up to the maximum size that can be wound conveniently and pulled tight in the spaces between the turns of the helix.

Figs. 2 and 2a show a sinker in which both ratios have a value of 2, these proportions being preferred for general application. In this case the helix has zero inside diameter and thus is applicable to the smallest lines. The spacing between the turns is equal to the diameter of the wire only, but this is ample for sinker purposes since the sinker will usually be used on lines substantially smaller than the diameter of the wire. With these proportions the line is wound and pulled tight between the turns of the helix in a spiral of short lead or pitch with a sharp crimping effect and a firm grip.

The pitch ratio can be decreased below the preferred value of 2 and down to a minimum value of about 1.25 as shown in Fig. 3, provided the diameter ratio does not exceed a value of 2.0. Thus Fig. 3a shows the preferred diameter ratio of 2. Values of pitch ratio less than 1.25 are undesirable because the turns of the helix are too close together to permit convenient application of even very small lines.

The diameter ratio may also be decreased somewhat below the preferred value of 2 at which the inside diameter or bore is zero. Thus Fig. 4 illustrates the preferred pitch ratio of 2 together with a diameter ratio (Fig. 4a) of only 1.5. If the diameter ratio is decreased below about 1.5, however, the depth of the helical spaces between the turns of the helix becomes too small to grip and hold the line firmly.

Helices with diameter ratios of 2 or less can be made by winding the helix on a small mandrel, withdrawing the mandrel, and then twisting the helix to tighten the coils. Another method is to roll the wound helix under pressure between two flat surfaces as illustrated diagrammatically in Fig. 5. This has the effect of decreasing the inside diameter or bore, and also of flattening the outside surface of the wire with results illustrated by Fig. 6. Thus large-sized wire can be wound into a helix and the outside diameter of the helix then reduced due both to reduction or elimination of the bore and to the flattening of the outside surface of the wire.

In some circumstances it may be desirable to provide more weight than that of the wire helix alone, and in such cases expedients such as illustrated in Figs. 7 and 8 may be desirable. Fig. 7 shows a sinker comprising a large heavy mass 4 having at each end a helix embodying the invention as described above. The coils 5 can be secured to the mass 4 in any suitable manner. One convenient method is to form a long helix and then cast or otherwise mold and secure the mass 4 to its center part, leaving the ends 5 projecting. The line 6 is then wound into one helix 5, led around the surface of the mass 4 and then wound into the other helix 5. To make a neater job and prevent abrasion of the line, a groove 7 may be provided in the surface of the mass 4 to receive the section of the line that leads from one coil 5 to the other. In this case the wire of the helix or helices should preferably be fairly stiff.

Fig. 8 shows a variation of Fig. 7 which is intended particularly to be attached to the end of a line. The large mass 8 is provided at one end with a helix 9 similar to the helices 5 of Fig. 7. At the other end is a knob 10 or other suitable projection on which a loop 11 of the line is secured, the line thence passing along a groove 12 to the helix 9 from which it emerges at 13.

It will be understood that the invention is not restricted to the several embodiments particularly described above, but may take various other forms without departing from its spirit. Also devices embodying the invention may have any desired size suitable for its intended use and may be of any material providing the desired properties such as softness and flexibility. Accordingly reference should be had to the appended claims for a definition of the limits of the invention.

What is claimed is:

1. A fishing sinker for attachment to a fishing line or leader at any point along its length and comprising a helix of flexible non-resilient metal wire, the maximum ratio of the outside diameter of the helix to the diameter of the wire being 2 to 1 and the range of the ratio of the pitch of the helix to the diameter of the wire being within the limits of 1.25 to 1 and 2 to 1, whereby the convolutions are spaced axially and provide between them a spiral groove into which the fishing line can be wound for attachment to the sinker, the free ends of the flexible metal wire being deformable inwardly into tight engagement with said line to prevent unwinding thereof and to hold the sinker against slipping on the line.

2. A sinker as defined in claim 1, the ends of said wire being cut off in planes substantially at right angles to the axis of the helix, thereby providing tips bendable inwardly around the line to prevent accidental unwinding.

THOMAS M. RECTOR.

REFERENCES CITED

The following references are of record in the file of this patent:

UNITED STATES PATENTS

| Number | Name | Date |
|---|---|---|
| 508,681 | Coey | Nov. 14, 1893 |
| 582,788 | Huebener | May 18, 1897 |

FOREIGN PATENTS

| Number | Country | Date |
|---|---|---|
| 818,314 | France | June 14, 1937 |
| 65,439 | Norway | Mar. 19, 1942 |